Figure 1:
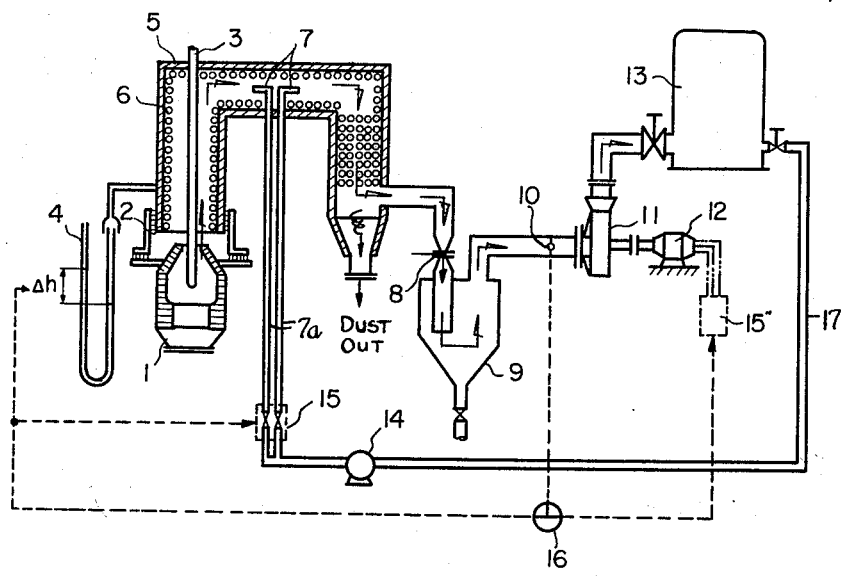

April 6, 1965 KEIJI OKANIWA ETAL 3,177,065
METHOD AND APPARATUS FOR RECOVERING WASTE GAS FROM
OXYGEN TOP BLOWING CONVERTER IN UNBURNED STATE
Filed Feb. 5, 1962

INVENTORS.
Keiji Okaniwa
Isao Takatama
Shigeru Maehara
Isoji Igarashi
BY
Wenderoth, Lind & Ponack
ATTORNEYS

3,177,065
METHOD AND APPARATUS FOR RECOVERING WASTE GAS FROM OXYGEN TOP BLOWING CONVERTER IN UNBURNED STATE
Keiji Okaniwa and Isao Takatama, Yokohama, Kanagawa Prefecture, and Shigeru Maehara and Isoji Igarashi, Yawata, Fukuoka Prefecture, Japan, assignors to Yawata Iron & Steel Co., Ltd., and Yokoyama Engineering Co., Ltd., both of Tokyo, Japan, and both corporations of Japan
Filed Feb. 5, 1962, Ser. No. 171,051
Claims priority, application Japan, Feb. 9, 1961, 36/4,473, 36/4,474
1 Claim. (Cl. 75—60)

The present invention relates to a method and apparatus for recovering waste gas in the unburned state from an oxygen top blowing converter and more particularly to a method and apparatus to control the gas pressure within the recovery equipment.

Because the waste gas discharged from an oxygent top blowing converter is known to be rich in CO gas, many improved methods have hitherto been contemplated to recover the waste gas in the unburned state but none of them seem to have achieved industrial success. This is because the blowing in the oxygen top blowing converter is repeated in a cycle of 20–30 min. and the unburned (or combustible) waste gas generated by oxygen blowing has a CO concentration as much as about 90% and this waste gas is liable to explode upon contact with air. Therefore, to prevent the hazard of this explosion said unburned (or combustible) waste gas must be collected in a gas holder through recovery equipment which is air tight with respect to open atmosphere. However, since the static gas pressure of the open atmosphere and the static gas pressure of the waste gas in the recovery equipment tend to fluctuate considerably during oxygen blowing in the said oxygen top blowing converter, control of the static gas pressure of both has been considered to be a very difficult task. As a result of their studies directed toward improving the method, the present inventors have overcome these problems and thereby developed the present invention.

An object of this invention is to provide a method to control the static pressure within the gas cooler to cool the unburned (or combustible) waste gas at the positive static pressure of several mm. of water column.

Another object of this invention is to provide a method to control the static pressure within the unburned (or combustible) waste gas cooler, particularly the static pressure at the opening of the said gas cooler which is closely placed around the converter throat at the positive static pressure not over a few mm. of water column.

Further object of this invention is to provide a device to control the static pressure within the gas cooler by controlling the flow rate of the waste gas in the equipment for recovering unburned waste gas.

Still further objects of this invention will be elucidated by the attached drawings and the explanations given below.

The drawing is a diagrammatic representation of the gas recovery equipment with arrows showing the waste gas recovery operation in one of the preferred embodiments of the present invention.

As a result of their studies seeking to develop recovery equipment for the safe recovery of unburned waste gas, the present inventors established an improved industrial method wherein only the waste gas is directed into the cooler, the open atmosphere being prevented from entering the gas cooler by covering the space between the converter throat and the cooler inlet by means of a "skirt," and the high temperature waste gas freshly discharged form the converter is reduced in volume by cooling in the gas cooler and is passed through the dust collector and then the cleaned waste gas is drawn by suction blower and finally stored in the gas holder.

Since it is inherent in this type of operation, however, that the decarburation reaction by oxygen blowing in a converter proceeds more or less in a pulsating manner, the static pressure in the gas cooler is subject to constant fluctuation (pulsation). If this fluctuation of static pressure is slight it causes no trouble but if it becomes great the risk of explosion increases and safe operation of this equipment cannot be expected.

In an improved method where the space between the converter throat and the inlet of the waste gas flue is covered with a "skirt" and the gap between the flue and the skirt and the converter side wall is given a labyrinth structure, and nitrogen or some other inert gas is injected into and seals this zone to make it air tight, better airtightness is secured, but safe operation of the whole apparatus cannot be accomplished by a passive method of preventing the open atmosphere from entering the equipment.

Now, in operating waste gas recovery equipment, the flow rate of gas tends to increase owing to introduction of nitrogen and occasional mixing into the waste gas of gases of the open atmosphere and also owing to the temperature being elevated by the combustion of the waste gas and as a consequence use of a gas cooler with a large capacity is rendered necessary and dust precipitation becomes more difficult and the explosion hazard also increases. Moreover, the amount of CO contained in the waste gas to be recovered in the unburned state is reduced and useless $CO_2$ and $N_2$ increase, and the use value of the waste gas is reduced. This is a fatal defect contrary to the object of recovering useful waste gas in the unburned state.

As a result of their experiments and studies made on recovery of the waste gas in an oxygen top blowing converter by using laboratory equipment, the present inventors succeeded in establishing a very stable and safe method of operation. In this improved method, only the waste gas having a useful value is recovered because mixing of useless nitrogen and infiltration of air liable to cause explosion are prevented by ejecting a small amount of waste gas by keeping the pressure within the cooler at less than 5–6 mm. (water column). In addition, the size of the cooler can be reduced and generation of $FE_2O_3$ which gives trouble during dust precipitation is eliminated.

The method of the present invention is characterized in providing at the top of an oxygen top blowing converter a cooler containing groups of water pipes and in maintaining the gas pressure within said gas cooler at a positive static pressure of less than 5–6 mm. of water column while the waste gas contained in the gas cooler is drawn by the suction blower through a gas conducting duct and passed through the dust collector and stored in the gas holder.

The method of the present invention is further characterized in providing at the top of an oxygen top blowing converter a gas cooler containing groups of water tubes and maintaining static pressure in the gas cooler by controlling the flow rate of waste gas at the exit of said gas cooler while the waste gas contained in the gas cooler is drawn by a suction blower through a gas conducting duct and passed through a dust collector and stored in a gas holder.

The present invention contemplates a positive method of completely preventing gases of the open atmosphere from entering the equipment and insure safety operation of the entire equipment. As stated previously, when pure oxygen is blown in from the throat of the top blowing converter the progress of generation of waste gas is by no means smooth or even and causes agitated motion of the entire steel bath to promote the decarburation reaction in the converter and accordingly the volume of waste gas generated tends to fluctuate.

As determined from the results of experiments, the gas pressure at the exit of the converter is liable to fluctuate even under relatively stable blowing condition.

Under such condition where static pressure of the waste gas pulsates, it is very difficult to prevent infiltration of the open atmosphere and leakage of the waste gas. In the event an abnormal decarburation reaction occurs, for some reason or other, the static pressure in the converter will show a rapid rise or drop, causing the waste gas in the unburned state to be ejected as a black smoke from the labyrinth or a large volume of air comes in through the labyrinth. If a large amount of air comes in, it will contact the CO in the waste gas and cause a combustion reaction which is liable to cause the waste gas to explode in the gas cooler. To eliminate the cause of such an explosion in the operation, the static pressure in the gas cooler is maintained at the normal static pressure under 5-6 mm. (water column) and preferably the waste gas is permitted to eject as black smoke from the air-tight section.

With a view to achieving the above purpose, the present invention comprises a method in which a gas cooler with groups of cooling water tubes is provided on the top of the oxygen top blowing converter, a gas injection pipe having two nozzles, each opening in the opposite direction, is mounted in the gas cooler so that recovered gas can be forcibly supplied during the operation of recovering the waste gas in the unburned state by drawing it through a duct and via a dust collector by means of a suction blower, and the gas duct is equipped with a waste gas flow control valve by which the action of said flow control valve and the action of said gas injection pipe are automatically controlled according to the detected value of the static pressure within the gas cooler so that the static pressure within the gas cooler can be maintained at a positive static pressure, i.e., a pressure above atmospheric under 5-6 mm., water column.

The present invention contemplates the achievement of the aforesaid purpose by sole or combined use of the damper mounted in the gas duct and the recovered gas injection pipe provided in the gas cooler as a means of controlling the pressure within the gas cooler.

In the attached drawing:

An oxygen top blowing converter 1 has a sealing skirt 2 arranged around the mouth thereof, and an oxygen lance 3 extends through the mouth of the converter into the interior thereof. A gas cooler 5 extends from the sealing skirt 2 upwardly from the converter, laterally of the converter, and then downwardly again, and in said gas cooler 5 are a plurality of cooling water ducts 6 over which gas flowing through the cooler 5 must flow during its passage through the cooler. A manometer 4 is attached to the cooler adjacent the mouth of the converter for indicating the pressure in the cooler, for example in mm. of water. Extending into the laterally extending part of the cooler 5 are two gas pipes 7a, one having a nozzle 7 on the end thereof facing in the downstream direction of gas flow through the cooler 5, and the other having a nozzle 7 facing in the upstream direction of gas flow through the cooler. A venturi throat 8 is connected to the end of the gas cooler 5, and a venturi scrubber 9 is connected to the venturi throat. From the venturi scrubber the gas flows through a conduit to a gas flow control valve which consists of a damper 10 for regulating gas flow in response to the value of the pressure within the gas cooler 5 as detected by the manometer 4. A suction blower 11 is positioned on the other side of the damper 10 from the venturi scrubber 9, and the blower 11 discharges into a gas holder 13. The blower 11 is driven by an electric motor 12, which can be a variable speed motor. A gas line 17 extends from the gas holder 13 to a pressure booster 14 and then to an automatic control valve 15 which controls gas flow from the gas line into the gas pipes 7a. A damper regulator 16 is connected to the damper 10, and a connection is provided between the manometer and the control valve 15, to the damper regulator 16 and to a motor regulator 15''.

The waste gas discharged from the converter 1 passes, as arrow shows, through the flue in the cooler and dust collector and is stored in the gas holder 13. As stated above, if the pressure within the gas cooler changes, the gas flow control valve 10 is set in operation by means of the damper regulator 16 in response to the pressure within the gas cooler ($\Delta h$) detected by the manometer 4, that is, the degree of the opening and closing of said gas flow control valve 10 is regulated. By this means the flow of gas through the gas pipe connecting the gas cooler and the suction blower is regulated so as to maintain the pressure within the gas cooler at a positive value below 5-6 mm. water column.

However, in the case where only the flow control valve is used, the response of the flow control valve tends inevitably to delay because of the longer distance from the gas cooler to the flow control valve and also because of the gas flow control valve and also because of the gas flow resisting dust collector existing on the way. Such delay will be the greatest especially when the static pressure within the gas cooler makes a rapid change. To eliminate such defect, the gas injection pipe 7a is provided in the gas cooler and a part of the recovered gas is injected in either of two directions from the nozzles on the ends of the pipe. The automatic control valve 15 responds to the change in the pressure within the gas cooler, as a result of which a part of the recovered waste gas flowing from the gas holder through the pipe connected with said gas holder is injected into the gas cooler through the nozzles of the gas jet pipe 7a. However, in practice, the injection of a part of the recovered gas through the nozzles of the gas jet pipe 7a for regulating the pressure within the gas cooler is to supplement the regulation by means of the gas flow control valve 10. The main regulation of the inner pressure of the gas cooler is carried out by the gas flow control valve 10. If the gas is injected in the same direction as that of the waste gas flow in the gas cooler, the static pressure within the gas cooler will drop and if injected in the opposite direction, the static pressure within the gas cooler will increase and the flow control valve will be caused to work quickly in response to the rapid change of the static pressure within the gas cooler. The gas to be used for injection is supplied from the gas holder 13, and after passing through the pressure booster 14 and the automatic control valve responsive to the static pressure in the gas cooler 15 is injected from the nozzles into the gas cooler. Of course, this method of controlling the static pressure within the gas cooler by gas injection can be practiced also by using steam and an inert gas such as nitrogen but caution must be taken not to reduce the value of the waste gas high in CO content by mixing into it useless gas. However, if the recovered gas is used for injection, the value of the useful waste gas will not be reduced in the least.

In equipment used under the present invention, the converter body and the gas cooler are completely airtight with respect to the open atmosphere and so the control of the static pressure within the gas cooler can be carried out by providing a damper 10 in the gas conducting pipe.

The means of controlling the static pressure within the gas cooler is not necessarily limited to the said damper because a good result may be obtained also be changing the volume of gas delivered by the blower 11 by making the motor 12 a variable speed motor.

For example, the static pressure within the gas cooler can be maintained at the normal static pressure by automatically controlling the variable speed motor to be run according to the value of the static pressure within the gas cooler as detected by the manometer and by controlling thereby the gas flow at the exit of the gas cooler. Since the oxygen blowing in the top blowing converter, as is well known, is performed in a given cycle of short duration, the flow rate of gas generated tends to fluctuate as oxygen blowing proceeds. It is very effective to control the flow rate of the waste gas drawn through the gas conducting pipe by the blower driven by the variable speed motor according to the detected value of the fluctuating static pressure differential and to control slight volume changes by means of the flow rate of gas injected from the waste gas injection pipe. When using this variable speed motor, the automatic gas flow rate control valve is not generally used but the combined use of both may not cause any trouble.

As stated above, since the converter and the gas cooler are air tight with respect to the open atmosphere, their inside forms one compartment and so the static pressure within the gas cooler can easily become normal static pressure throughout the collection equipment during generation of the waste gas by the blowing. When the static pressure within the gas cooler reaches the normal static pressure, it become inevitable that a slight volume of the waste gas will break through the seal of an inert gas and jet out from the air-tight part 2 but this will cause no trouble in the safe operation of waste gas recovery equipment.

From the experiments, it has been found that the static pressure within the gas cooler should be maintained at the normal static pressure under 1 mm. of water column above atmospheric as the most desirable condition to prevent the loss of the waste gas. It has also been found that when the static pressure within the gas cooler is maintained at the normal static pressure, it will cause no trouble in operaion even if the static pressure in a part of the gas conducting duct other than the gas cooler, reaches a negative static pressure with respect to atmospheric. The static pressure within the gas cooler can be detected by any conventional method and it is effective to combine the detection mechanism with the damper or other device to control static pressure within the gas cooler, in a automatic control.

*Example I*

Weight of molten iron: 2030 kg.
Steel produced: 1800 kg.
Blowing time: 17 min. 55 sec.
Temperature of molten iron after the blowing: 1640° C.
Pressure of oxygen blowing: 8.5 kg./cm.$^2$.
Oxygen used: 115 m.$^3$.
Composition of molten iron: C=4.14%, Si=0.40%, Mn=0.77%, P=0.213%, S=0.030%.
Composition of the tapped steel: C=0.03%, Si=0.01%, Mn=0.13%, P=0.024%, S=0.016%.
3 min. after the start of blowing:
 Temperature of gas at the exit of the waste gas cooler: 70° C.
 Temperature of gas at inlet to suction blower: 28° C.
 Static pressure at the exit of gas cooler: −23 mm. water.
 Static pressure at the exit of dust collector: −250 mm. water.
 Flow rate of the waste gas: 480 Nm.$^3$/h.
 Composition of waste gas: $CO_2$=43.9%, $O_2$=12.3%, CO=6.4%, $N_2$=57.4%.
8 min. after the start of blowing:
 Temperature of gas at the exit of waste gas cooler: 300° C.
 Temperature of gas at the inlet to suction fan: 28° C.
 Static pressure at the exit of cooler: −42 mm. water.
 Static pressure at the exit of dust collector: −710 mm. water.
 Flow rate of waste gas: 960 Nm.$^3$/h.
 Composition of waste gas: $CO_2$=34.4%, $O_2$=0.0%, CO=52.6%, $N_2$=13.0%.
15 min. after the start of blowing:
 Temperature of gas at the exit of waste gas cooler: 570° C.
 Temperature of gas at the inlet to suction fan: 28° C.
 Static pressure at the exit of the cooler: −15 mm. water.
 Static pressure at the exit of dust collector: −210 mm. water.
 Composition of the waste gas: $CO_2$=12.5%, $O_2$=0.4%, CO=76.4%, $N_2$=10.7%.

*Example II*

Weight of molten iron: 2090 kg.
Weight of steel produced: 1800 kg.
Blowing time: 16 min. 45 sec.
Temperature of molten iron after blowing: 1610° C.
Pressure of oxygen blowing: 8.5 kg./cm.$^2$.
Oxygen used: 110 m.$^3$.
Composition of molten iron: C=4.54%, Si=0.39%, Mn=0.77%, P=0.250%, S=0.026%.
Composition of the tapped steel: C=0.04%, Si=0.01%, Mn=0.13%, P=0.040%, S=0.020%.
4 min. after the start of blowing:
 Temperature of gas at the exit of the waste gas cooler 100° C.
 Temperature of gas at the inlet to the suction fan: 28° C.
 Static pressure at the exit of the cooler: −25 mm. water.
 Static pressure at the exit of dust collector: −220 mm. water.
 Volume of waste gas: 660 Nm.$^3$/h.
 Composition of the waste gas: $CO_2$=31.6%, $O_2$=10%, CO=50.3%, $N_2$=17.1%.
8 min. after the start of blowing:
 Temperature of gas at the exit of waste gas cooler: 250° C.
 Temperature of gas at the inlet to suction fan. 28° C.
 Static pressure at the exit of the cooler: −35 mm. water.
 Static pressure at the exit of dust collector: −680 mm. water.
 Flow rate of waste gas: 925 Nm.$^3$/h.
 Composition of waste gas: $CO_2$=15.4%, $O_2$=2.0%, CO=60.0%, $N_2$=22.6%.
15 min. after the start of blowing:
 Temperature of gas at the exit of the waste gas cooler: 350° C.
 Temperature of gas at the linet to suction fan: 28° C.
 Static pressure at the exit of the gas cooler: −15 mm. water.
 Static pressure at the exit of dust collector: −230 mm. water.
 Flow rate of waste gas: 350 Nm.$^3$/h.
 Composition of waste gas: $CO_2$=9.6%, $O_2$=0.6%, CO=77.4%, $N_2$=12.6%.

What we claim is:

In a method of recovering combustible waste gas generated in refining pig iron by blowing pure oxygen into a converter by causing the waste gas to flow in an unburned state into a gas cooler closely mounted over the top of the converter and drawing the cooled waste gas into a gas holder through a gas pipe connected with said gas cooler by means of a suction blower, the steps of sealing the joint between the top of the converter and said gas cooler by means of an inert gas, detecting the pressure within the gas cooler and automatically regulating gas flow by valving the gas flow in said gas pipe according to the value of the cooler pressure detected so as to maintain the hood pressure at a positive pressure below 5 mm. water column.

References Cited by the Examiner

UNITED STATES PATENTS

| 2,732,289 | 7/56 | Goeke | 48—203 X |
| 2,855,194 | 10/58 | Konig | 266—35 |
| 2,954,244 | 9/60 | Austin | 75—60 |
| 2,993,780 | 7/61 | Allard | 75—59 X |
| 3,011,966 | 12/61 | Jahnentz et al. | 55—89 X |
| 3,084,039 | 4/63 | Baum | 75—60 X |

FOREIGN PATENTS 609,053   11/60   Canada.

BENJAMIN HENKIN, *Primary Examiner.*
REUBEN FRIEDMAN, *Examiner.*